United States Patent
Hammad et al.

(10) Patent No.: US 8,489,506 B2
(45) Date of Patent: *Jul. 16, 2013

(54) PORTABLE CONSUMER DEVICE VERIFICATION SYSTEM

(75) Inventors: Ayman Hammad, Pleasanton, CA (US); Patrick Faith, Pleasanton, CA (US)

(73) Assignee: Visa U.S.A. Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/882,716

(22) Filed: Sep. 15, 2010

(65) Prior Publication Data

US 2011/0004526 A1    Jan. 6, 2011

Related U.S. Application Data (62) Division of application No. 11/764,361, filed on Jun. 18, 2007, now Pat. No. 7,819,322.

(60) Provisional application No. 60/884,089, filed on Jan. 9, 2007, provisional application No. 60/815,430, filed on Jun. 20, 2006, provisional application No. 60/815,059, filed on Jun. 19, 2006.

(51) Int. Cl.
*G06Q 40/00* (2012.01)
*G06K 7/08* (2006.01)

(52) U.S. Cl.
USPC ............ 705/44; 235/449; 235/380; 324/690; 324/663; 324/662

(58) Field of Classification Search
USPC .................. 705/44; 235/449, 380; 324/662, 324/690, 663
See application file for complete search history.

(56) References Cited

U.S. PATENT DOCUMENTS

| 3,956,615 A | 5/1976 | Anderson et al. |
| 4,186,871 A | 2/1980 | Anderson et al. |

(Continued)

FOREIGN PATENT DOCUMENTS

| CN | 1344396 A | 4/2002 |
| JP | 3149690 A | 6/1991 |

(Continued)

OTHER PUBLICATIONS

White Paper; Magneprint: A Real Time Risk Management Tool; by Kiran Gandhi; 6 pages; 2004 @ www.greensheet.com/gs_archieve.php?/issue_number=040302&story=6.*

(Continued)

*Primary Examiner* — Ella Colbert
*Assistant Examiner* — Mary Gregg
(74) *Attorney, Agent, or Firm* — Kilpatrick Townsend & Stockton LLP (57) ABSTRACT

A method for verifying a portable consumer device. The method includes receiving an authorization request message associated with a transaction conducted using a portable consumer device. The portable consumer device includes a portable consumer device fingerprint. The authorization request message includes an altered portable consumer device fingerprint and an algorithm identifier. The method also includes selecting an algorithm from among a plurality of algorithms using the algorithm identifier, determining the portable consumer device fingerprint using selected algorithm and the altered portable consumer device fingerprint, determining if the portable consumer device fingerprint matches a stored portable consumer device fingerprint, and sending an authorization response message after determining if the portable consumer device fingerprint matches the stored portable consumer device fingerprint.

26 Claims, 8 Drawing Sheets

U.S. PATENT DOCUMENTS

| | | | |
|---|---|---|---|
| 4,238,853 A | 12/1980 | Ehrsam et al. | |
| 4,277,837 A | 7/1981 | Stuckert | |
| 4,317,957 A | 3/1982 | Sendrow | |
| 4,423,287 A | 12/1983 | Zeidler | |
| 4,528,442 A | 7/1985 | Endo | |
| 4,758,714 A * | 7/1988 | Carlson et al. | 235/380 |
| 5,163,097 A | 11/1992 | Pegg | |
| 5,254,843 A | 10/1993 | Hynes et al. | |
| 5,311,594 A | 5/1994 | Penzias | |
| 5,420,926 A | 5/1995 | Low et al. | |
| 5,434,398 A | 7/1995 | Goldberg | |
| 5,465,387 A | 11/1995 | Mukherjee | |
| 5,513,250 A | 4/1996 | McAllister | |
| 5,530,438 A | 6/1996 | Bickham et al. | |
| 5,539,810 A | 7/1996 | Kennedy et al. | |
| 5,577,121 A | 11/1996 | Davis et al. | |
| 5,615,110 A | 3/1997 | Wong | |
| 5,625,689 A | 4/1997 | Indeck et al. | |
| 5,627,355 A | 5/1997 | Rahman et al. | |
| 5,679,940 A | 10/1997 | Templeton et al. | |
| 5,708,422 A | 1/1998 | Blonder et al. | |
| 5,721,781 A | 2/1998 | Deo et al. | |
| 5,740,244 A | 4/1998 | Indeck et al. | |
| 5,745,576 A | 4/1998 | Abraham et al. | |
| 5,774,525 A | 6/1998 | Kanevsky et al. | |
| 5,819,226 A | 10/1998 | Gopinathan et al. | |
| 5,832,458 A | 11/1998 | Jones | |
| 5,834,747 A | 11/1998 | Cooper | |
| 5,835,599 A | 11/1998 | Buer | |
| 5,839,119 A | 11/1998 | Krsul et al. | |
| 5,872,834 A | 2/1999 | Teitelbaum | |
| 5,878,337 A | 3/1999 | Joao et al. | |
| 5,883,810 A | 3/1999 | Franklin | |
| 5,903,830 A | 5/1999 | Joao et al. | |
| 5,914,471 A | 6/1999 | Van De Pavert | |
| 5,914,472 A | 6/1999 | Foladare et al. | |
| 5,920,628 A * | 7/1999 | Indeck et al. | 360/25 |
| 5,956,699 A | 9/1999 | Wong et al. | |
| 5,988,497 A | 11/1999 | Wallace | |
| 6,005,942 A | 12/1999 | Chan et al. | |
| 6,012,144 A | 1/2000 | Pickett | |
| 6,016,476 A | 1/2000 | Maes et al. | |
| 6,029,154 A | 2/2000 | Pettitt | |
| 6,055,505 A | 4/2000 | Elston | |
| 6,064,990 A | 5/2000 | Goldsmith | |
| 6,081,792 A | 6/2000 | Cucinotta et al. | |
| 6,095,413 A | 8/2000 | Tetro et al. | |
| 6,105,006 A * | 8/2000 | Davis et al. | 705/35 |
| 6,112,191 A | 8/2000 | Burke | |
| 6,122,624 A | 9/2000 | Tetro et al. | |
| 6,157,707 A | 12/2000 | Baulier et al. | |
| 6,219,793 B1 | 4/2001 | Li et al. | |
| 6,260,146 B1 | 7/2001 | Mos et al. | |
| 6,263,447 B1 | 7/2001 | French et al. | |
| 6,282,656 B1 | 8/2001 | Wang | |
| 6,298,336 B1 | 10/2001 | Davis et al. | |
| 6,308,890 B1 | 10/2001 | Cooper | |
| 6,330,550 B1 | 12/2001 | Brisebois et al. | |
| 6,367,011 B1 | 4/2002 | Lee et al. | |
| 6,442,532 B1 | 8/2002 | Kawan | |
| 6,488,206 B1 | 12/2002 | Flaig et al. | |
| 6,496,936 B1 | 12/2002 | French et al. | |
| 6,505,046 B1 | 1/2003 | Baker | |
| 6,523,745 B1 | 2/2003 | Tamori | |
| 6,529,725 B1 | 3/2003 | Joao et al. | |
| 6,535,855 B1 | 3/2003 | Cahill et al. | |
| 6,592,044 B1 | 7/2003 | Wong et al. | |
| 6,607,136 B1 | 8/2003 | Atsmon et al. | |
| 6,612,488 B2 | 9/2003 | Suzuki | |
| 6,647,269 B2 | 11/2003 | Hendrey et al. | |
| 6,714,918 B2 | 3/2004 | Hillmer et al. | |
| 6,715,672 B1 | 4/2004 | Tetro et al. | |
| RE38,572 E | 8/2004 | Tetro et al. | |
| 6,775,539 B2 | 8/2004 | Deshpande | |
| 6,816,058 B2 | 11/2004 | McGregor et al. | |
| 6,830,183 B2 | 12/2004 | von Mueller et al. | |
| 6,832,721 B2 | 12/2004 | Fujii | |
| 6,836,670 B2 | 12/2004 | Castrogiovanni et al. | |
| 6,837,425 B2 | 1/2005 | Gauthier et al. | |
| 6,839,840 B1 | 1/2005 | Cooreman | |
| 6,839,845 B2 | 1/2005 | Hsu et al. | |
| 6,850,916 B1 | 2/2005 | Wang | |
| 6,857,073 B2 | 2/2005 | French et al. | |
| 6,862,575 B1 | 3/2005 | Anttila et al. | |
| 6,868,391 B1 | 3/2005 | Hultgren | |
| 6,877,661 B2 | 4/2005 | Webb et al. | |
| 6,899,269 B1 | 5/2005 | Deland | |
| 6,913,194 B2 | 7/2005 | Suzuki | |
| 6,944,782 B2 | 9/2005 | von Mueller et al. | |
| 6,948,656 B2 | 9/2005 | Williams | |
| 6,968,180 B2 | 11/2005 | Kirby et al. | |
| 6,980,660 B1 | 12/2005 | Hind et al. | |
| 6,983,882 B2 | 1/2006 | Cassone | |
| 7,003,495 B1 | 2/2006 | Burger et al. | |
| 7,003,497 B2 | 2/2006 | Maes | |
| 7,007,840 B2 | 3/2006 | Davis | |
| 7,013,293 B1 | 3/2006 | Kipnis et al. | |
| 7,024,396 B2 | 4/2006 | Woodward | |
| 7,044,394 B2 | 5/2006 | Brown | |
| 7,051,002 B2 | 5/2006 | Keresman, III et al. | |
| 7,058,611 B2 | 6/2006 | Kranzley et al. | |
| 7,058,978 B2 | 6/2006 | Feuerstein et al. | |
| 7,096,003 B2 | 8/2006 | Joao et al. | |
| 7,107,250 B2 | 9/2006 | Harrison | |
| 7,143,095 B2 | 11/2006 | Barrett et al. | |
| 7,152,788 B2 | 12/2006 | Williams | |
| 7,225,156 B2 | 5/2007 | Fisher et al. | |
| 7,243,853 B1 | 7/2007 | Levy et al. | |
| 7,251,624 B1 | 7/2007 | Lee et al. | |
| 7,257,545 B1 | 8/2007 | Hung | |
| 7,264,154 B2 | 9/2007 | Harris | |
| 7,343,317 B2 | 3/2008 | Jokinen et al. | |
| 7,349,668 B2 | 3/2008 | Ilan et al. | |
| D568,388 S | 5/2008 | Hammad | |
| D568,389 S | 5/2008 | Hammad | |
| D568,390 S | 5/2008 | Law et al. | |
| D571,399 S | 6/2008 | Hammad et al. | |
| D571,856 S | 6/2008 | Hammad et al. | |
| D572,752 S | 7/2008 | Hammad et al. | |
| D573,181 S | 7/2008 | Hammad et al. | |
| 7,403,908 B1 | 7/2008 | Jaramillo | |
| D575,815 S | 8/2008 | Hammad et al. | |
| D576,207 S | 9/2008 | Hammad et al. | |
| 7,420,474 B1 | 9/2008 | Elks et al. | |
| D578,158 S | 10/2008 | Hammad et al. | |
| D580,974 S | 11/2008 | Hammad et al. | |
| D584,769 S | 1/2009 | Hammad et al. | |
| 7,527,208 B2 | 5/2009 | Hammad et al. | |
| 7,575,177 B2 | 8/2009 | Killian et al. | |
| 7,740,168 B2 | 6/2010 | Hammad et al. | |
| 7,761,374 B2 | 7/2010 | Sahota et al. | |
| 7,810,165 B2 | 10/2010 | Hammad et al. | |
| 7,818,264 B2 | 10/2010 | Hammad et al. | |
| 7,819,322 B2 | 10/2010 | Hammad et al. | |
| 2001/0044777 A1 | 11/2001 | Haley et al. | |
| 2002/0073046 A1 * | 6/2002 | David | 705/67 |
| 2002/0091562 A1 | 7/2002 | Siegel et al. | |
| 2002/0091945 A1 | 7/2002 | Ross | |
| 2002/0095389 A1 | 7/2002 | Gaines | |
| 2002/0099665 A1 | 7/2002 | Burger et al. | |
| 2002/0108062 A1 | 8/2002 | Nakajima et al. | |
| 2002/0133462 A1 | 9/2002 | Shteyn | |
| 2002/0153424 A1 | 10/2002 | Li et al. | |
| 2002/0194499 A1 | 12/2002 | Audebert et al. | |
| 2003/0001005 A1 * | 1/2003 | Risafi et al. | 235/380 |
| 2003/0074317 A1 | 4/2003 | Hofi | |
| 2003/0115142 A1 | 6/2003 | Brickell et al. | |
| 2003/0126079 A1 | 7/2003 | Roberson et al. | |
| 2003/0135463 A1 | 7/2003 | Brown et al. | |
| 2003/0169881 A1 | 9/2003 | Niedermeyer | |
| 2003/0200184 A1 | 10/2003 | Dominguez et al. | |
| 2003/0208684 A1 | 11/2003 | Camacho et al. | |
| 2003/0222135 A1 | 12/2003 | Stoutenburg et al. | |
| 2003/0225703 A1 | 12/2003 | Angel | |
| 2004/0003285 A1 * | 1/2004 | Whelan et al. | 713/201 |
| 2004/0014423 A1 * | 1/2004 | Croome et al. | 455/41.2 |
| 2004/0024638 A1 | 2/2004 | Restis | |

| | | |
|---|---|---|
| 2004/0031856 A1 | 2/2004 | Atsmon et al. |
| 2004/0059688 A1 | 3/2004 | Dominguez et al. |
| 2004/0064403 A1 | 4/2004 | Hasumi et al. |
| 2004/0078340 A1 | 4/2004 | Evans |
| 2004/0107170 A1 | 6/2004 | Labrou et al. |
| 2004/0122747 A1* | 6/2004 | Jimenez et al. .............. 705/27 |
| 2004/0156537 A1 | 8/2004 | Chung et al. |
| 2004/0171406 A1 | 9/2004 | Purk |
| 2004/0185830 A1 | 9/2004 | Joao et al. |
| 2004/0199470 A1 | 10/2004 | Ferry et al. |
| 2005/0029349 A1 | 2/2005 | McGregor et al. |
| 2005/0060233 A1 | 3/2005 | Bonalle et al. |
| 2005/0060730 A1 | 3/2005 | Soeda et al. |
| 2005/0071226 A1 | 3/2005 | Nguyen et al. |
| 2005/0071227 A1 | 3/2005 | Hammad et al. |
| 2005/0071228 A1 | 3/2005 | Bortolin et al. |
| 2005/0071235 A1 | 3/2005 | Nguyen et al. |
| 2005/0080730 A1 | 4/2005 | Sorrentino |
| 2005/0097320 A1 | 5/2005 | Golan et al. |
| 2005/0122209 A1 | 6/2005 | Black |
| 2005/0149455 A1 | 7/2005 | Bruesewitz et al. |
| 2005/0170814 A1 | 8/2005 | Joao et al. |
| 2005/0171905 A1 | 8/2005 | Wankmueller et al. |
| 2005/0218229 A1* | 10/2005 | Morley et al. .............. 235/449 |
| 2005/0228986 A1 | 10/2005 | Fukasawa et al. |
| 2005/0268107 A1 | 12/2005 | Harris et al. |
| 2005/0273442 A1 | 12/2005 | Bennett et al. |
| 2006/0018523 A1 | 1/2006 | Saitoh et al. |
| 2006/0059110 A1 | 3/2006 | Madhok et al. |
| 2006/0136546 A1 | 6/2006 | Trioano et al. |
| 2006/0165060 A1 | 7/2006 | Dua |
| 2006/0202025 A1 | 9/2006 | Calabrese et al. |
| 2006/0219776 A1 | 10/2006 | Finn |
| 2006/0281439 A1 | 12/2006 | Benco et al. |
| 2006/0282382 A1 | 12/2006 | Balasubramanian et al. |
| 2006/0290501 A1 | 12/2006 | Hammad et al. |
| 2006/0293027 A1 | 12/2006 | Hammad et al. |
| 2007/0017970 A1 | 1/2007 | Gauthier et al. |
| 2007/0021126 A1* | 1/2007 | Nanda et al. .............. 455/456.1 |
| 2007/0034679 A1 | 2/2007 | Gauthier et al. |
| 2007/0034700 A1 | 2/2007 | Poidomani et al. |
| 2007/0045398 A1 | 3/2007 | Chen |
| 2007/0055630 A1 | 3/2007 | Gauthier et al. |
| 2007/0057034 A1 | 3/2007 | Gauthier et al. |
| 2007/0136131 A1 | 6/2007 | Mankoff |
| 2007/0250380 A1 | 10/2007 | Mankoff |
| 2007/0260544 A1 | 11/2007 | Wankmueller |
| 2007/0288641 A1 | 12/2007 | Lee et al. |
| 2007/0294182 A1 | 12/2007 | Hammad |
| 2008/0004121 A1 | 1/2008 | Gatto et al. |
| 2008/0005037 A1 | 1/2008 | Hammad et al. |
| 2008/0029593 A1 | 2/2008 | Hammad et al. |
| 2008/0034221 A1 | 2/2008 | Hammad et al. |
| 2008/0040271 A1 | 2/2008 | Hammad et al. |
| 2008/0040276 A1 | 2/2008 | Hammad et al. |
| 2008/0065553 A1 | 3/2008 | Faith et al. |
| 2008/0103982 A1 | 5/2008 | Hammad et al. |
| 2008/0116264 A1 | 5/2008 | Hammad et al. |
| 2008/0120214 A1 | 5/2008 | Steele et al. |
| 2008/0120236 A1 | 5/2008 | Faith et al. |
| 2008/0163257 A1 | 7/2008 | Carlson et al. |
| 2008/0183480 A1 | 7/2008 | Carlson et al. |
| 2008/0201212 A1 | 8/2008 | Hammad et al. |
| 2008/0203151 A1 | 8/2008 | Dixon et al. |
| 2008/0203152 A1 | 8/2008 | Hammad et al. |
| 2008/0203170 A1 | 8/2008 | Hammad et al. |
| 2008/0208681 A1 | 8/2008 | Hammad et al. |
| 2008/0232582 A1 | 9/2008 | Chevallier-Mames et al. |
| 2008/0303632 A1 | 12/2008 | Hammad |
| 2009/0171682 A1 | 7/2009 | Dixon et al. |
| 2009/0202081 A1 | 8/2009 | Hammad et al. |

FOREIGN PATENT DOCUMENTS

| | | |
|---|---|---|
| JP | 11213044 A | 8/1999 |
| JP | 2003 281476 A | 10/2003 |
| JP | 2005 062957 A | 3/2005 |
| WO | 9831123 A1 | 7/1998 |
| WO | 00/52866 A2 | 9/2000 |
| WO | 2005 001635 A2 | 1/2005 |

OTHER PUBLICATIONS

Adaptive Water Marking by Wong et al.: Department of electronic engineering, City University of Hong Kong 83, Tat Chee Avenue, Kowloon Tong, Hong Kong EELCheng@cityu.edu.hk; 7 pages.*
White Paper: Magneprint: A real time Risk Management Tool by Gandhi; Green Sheet Archives; 6 pages 2004.*
"Fujitsu Microelectronics America Announces New Fingerprint Identification Technology for Cell Phones, Mobile Devices" Mar. 11, 2002 by Fujitsu Microelectronics America, Inc at www.fujitsu.com/us/news/pr/fma.sub.--20020311.html.
Dictionary of computers information processing and Telecommunications; 2nd edition by Jerry M. Rosenburge, Ph. D ; 3 pages; Copywrite 1987 by John Wiley and Sons Inc.
Search/Examination Report dated Jun. 25, 2010 from Australian Patent Application No. 2007261082, 4 pages.
Search/Examination Report dated Apr. 10, 2008 from International Patent Application No. PCT/US07/71376, 4 pages.
Australian Office Action mailed on Feb. 15, 2011, for AU Patent Application No. 2007261082, 2 pages.
Australian Notice of Acceptance mailed on Jul. 7, 2011, for AU Patent Application No. 2007261082, 3 pages.
Chinese Office Action mailed on Mar. 1, 2012, for CN Patent Application No. 200780022875.X, with English translation, 19 pages.
Written Opinion of the International Searchign Authority mailed on Apr. 10, 2008, for PCT Patent Application No. PCT/US07/71376, 7 pages.
Japanese Office Action Issued in JP Patent Application No. 2009-516648 on Aug. 31, 2012, with English Translation, 8 pages.
Chinese Office Action Issued in CN Patent Application No. 200780022875.X on Aug. 21, 2012, with English Translation, 21 pages.
Final Office Action mailed on Oct. 26, 2012 for US Appl. No. 11/764,343, 16 pages.

* cited by examiner

PORTABLE CONSUMER DEVICE VERIFICATION SYSTEM

CROSS-REFERENCES TO RELATED APPLICATIONS

This application is a divisional patent application of and claims priority to U.S. patent application Ser. No. 11/764,361, filed Jun. 18, 2007, and the benefit of the filing dates of U.S. Provisional Patent Application No. 60/815,059, filed on Jun. 19, 2006, U.S. Provisional Patent Application No. 60/815,430 filed on Jun. 20, 2006, and U.S. Provisional Patent Application No. 60/884,089 filed on Jan. 9, 2007. All of these applications are herein incorporated by reference in their entirety for all purposes.

BACKGROUND OF THE INVENTION

Under certain circumstances, thieves can "skim" a card, by copying the data on the magnetic stripe of the card. If the data on the magnetic stripe on a payment card is skimmed, an unauthorized user can create a fake card with the copied data. The fake card can then be used in a fraudulent manner.

A number of security mechanisms are offered by a number of companies. Some companies have developed ways in which a specific pattern of magnetic particles can be embedded in the magnetic stripe of a credit card. The magnetic stripe may encode consumer data such as an account number, and the magnetic stripe itself may have a unique fingerprint that is defined by the specific pattern of magnetic particles. The fingerprint may be used to identify and authenticate the card that is being used. That is, even if thief is able to skim consumer data from a portable consumer device, the thief will not be able to obtain the unique fingerprint. This technology is commercially available from Magtek™.

Although the use of this technology would help authenticate credit cards and the like, the widespread adoption of this technology is not practical as software and hardware changes would be needed for thousands of point of sale terminals. In practice, in a payment processing system, many different types of authentication technologies would be used and there is a need to provide for systems which can use many of these types of different technologies. Hence, there is a need for systems and methods, which can integrate such technologies and use them effectively.

Embodiments of the invention address the above problems and other problems individually and collectively.

SUMMARY OF THE INVENTION

Embodiments of the invention includes systems and methods for authenticating portable consumer devices such as payment cards.

One embodiment of the invention is directed to a method for verifying a portable consumer device. The method includes receiving an authorization request message associated with a transaction conducted using a portable consumer device. The portable consumer device includes a portable consumer device fingerprint. The authorization request message includes an altered portable consumer device fingerprint and an algorithm identifier. The method also includes selecting an algorithm from among a plurality of algorithms using the algorithm identifier, determining the portable consumer device fingerprint using selected algorithm and the altered portable consumer device fingerprint, determining if the portable consumer device fingerprint matches a stored portable consumer device fingerprint, and sending an authorization response message after determining if the portable consumer device fingerprint matches the stored portable consumer device fingerprint.

Another embodiment of the invention is directed to a method comprising sending an authorization request message associated with a transaction conducted using a portable consumer device, wherein the portable consumer device comprises a portable consumer device fingerprint, and wherein the authorization request message comprises an altered portable consumer device fingerprint and an algorithm identifier. An algorithm is selected from among a plurality of algorithms using the algorithm identifier, and the portable consumer device fingerprint is determined using selected algorithm and the altered portable consumer device fingerprint. A server computer determines if the portable consumer device fingerprint matches a stored portable consumer device fingerprint, and an authorization response message is received. The authorization response message indicates whether or not the transaction is approved.

Another embodiment of the invention is directed to a method comprising receiving an authorization request message, wherein the authorization request message is generated after an interaction between a portable consumer device and an access device. The method also includes analyzing the authorization request message for one or more characteristics or the portable consumer device or the access device to determine if a confidence threshold is met or exceeded, and if the confidence threshold is not exceeded, performing additional authentication processing.

Other embodiments of the invention are directed to systems, computer readable media, access devices, etc. used in conjunction with such methods.

These and other embodiments of the invention are described in further detail below.

DETAILED DESCRIPTION

I. Methods Using Algorithm Identifiers

In embodiments of the invention, a payment processing organization or other entity may support different security technologies offered by different companies. The different security technologies may use portable consumer device fingerprints. For example, two magnetic stripes on two payment cards can store identical consumer data (e.g., account number information), but the magnetic structures of the two magnetic stripes may be different. A specific magnetic structure may be an example of a fingerprint or "DNA" that is associated with a payment card. If a thief copied the consumer data stored on a magnetic stripe to an unauthorized credit card, the magnetic stripe of the unauthorized credit card would have a different magnetic structure or fingerprint than the authorized credit card. A back end server computer receiving the authorization request message in response to the unauthorized card's use would determine that the unauthorized credit card is not real, because the fingerprint is not present in the authorization request message. Two companies that offer this type of technology are Magtek™ and Semtek™. Each company uses its own proprietary algorithm in a point of sale terminal to alter (e.g., encrypt) its own fingerprint before it is sent to an issuer or other entity in a subsequent authentication process.

In embodiments of the invention, a portable consumer device fingerprint may include any suitable identification mechanism that allows one to identify the portable consumer device, independent of static consumer data such as an account number or expiration date associated with the portable consumer device. Typically, unlike consumer data, portable consumer device fingerprint data is not known to the consumer. For instance, in some embodiments, the fingerprint data may relate to characteristics of the materials from which the portable consumer devices are made. For example, as noted above, a portable consumer device fingerprint can be embedded within the particular microscopic structure of the magnetic particles in the magnetic stripe in a payment card. In some cases, no two magnetic stripes will have same portable consumer device fingerprint.

Portable consumer device fingerprints can take other forms. For example, another card verification technology comes from a company called QSecure™. The technology offered by QSecure™ uses a dynamic CVV (card verification value) that can be generated by a chip in a payment card (the chip may be under a magnetic stripe and can write the dynamic CVV or a number related to the dynamic CVV to the magnetic stripe). In this case, the dynamic CVV may act as a portable consumer device fingerprint identifying the particular portable consumer device. The dynamic CVV may be sent to a point of sale device during a payment transaction. A specific algorithm in the point of sale device may alter (e.g., encrypt) the dynamic CVV before it is sent to the issuer of the payment card for authorization. The issuer, payment processing organization, or other entity, may receive the altered dynamic CVV and may restore it to its original form. The dynamic CVV can then be checked by the back end server computer to see if it corresponds to an independently derived dynamic CVV, thereby authenticating the portable consumer device. In this example, the dynamic CVV value could also be considered a portable consumer device fingerprint, even though it is dynamic in nature.

Embodiments of the invention allow for many different types of portable consumer device fingerprinting systems to be used together in a single payment processing system. In embodiments of the invention, a different identifier or ID is assigned to each type of algorithm in each type of POS terminal. For example, a back end entity such as an issuer or a payment processing organization might use algorithm identifiers like those in Table 1 below.

TABLE 1

| Algorithm Identifier | Description of Algorithm |
|---|---|
| 01 | Company A magnetic stripe fingerprint encryption algorithm |
| 02 | Company B magnetic stripe fingerprint encryption algorithm |

TABLE 1-continued

| Algorithm Identifier | Description of Algorithm |
|---|---|
| 03 | Company C dynamic CVV encryption algorithm |

As shown in Table 1, the algorithm ID may take any suitable form. For example, the algorithm IDs may simply be one, two, or three digit numbers.

When the POS terminal sends an authorization request message to an issuer, the authorization request message may contain the particular algorithm ID associated with the POS terminal and an altered portable consumer device fingerprint. When the authorization request message is received by a back end server computer, it can determine which algorithm was used to encrypt the portable consumer device fingerprint. The back end server computer may then decrypt the encrypted portable consumer device fingerprint and may determine if the portable consumer device fingerprint corresponds to the portable consumer device fingerprint that is stored in a back end database. The portable consumer device fingerprint may have been previously stored in the back end database along with corresponding consumer data (e.g., an account number) as part of the process of issuing the portable consumer device to the consumer who will use it.

Using such algorithm identifiers, embodiments of the invention can effectively integrate different technologies into a single payment processing system. For example, a consumer can swipe a payment card through a POS (point of sale) terminal to pay $5.00 for office supplies. The POS terminal may contain an encryption algorithm produced by Company A. The encryption algorithm may encrypt a fingerprint that is embedded in the magnetic structure of the magnetic stripe of the payment card. The POS terminal may then send an authorization request message to a back end server computer. The authorization request message may contain information including the purchase amount, consumer data such as the consumer's account number, the encrypted fingerprint, and an algorithm identifier that is specifically associated with the encryption algorithm produced by company A. The back end server computer can receive the authorization request message from a POS (point of sale) terminal. It can then determine which algorithm was used to encrypt the fingerprint, and can subsequently decrypt the fingerprint. Once the fingerprint is determined, the back end server computer can determine if the received fingerprint corresponds to the stored fingerprint. If it does, then the payment card is authenticated.

Other details regarding methods and systems that utilize algorithm identifiers are provided below.

II. Confidence Assessment Methods

In some embodiments, the back end processor, or back end server computer, can also determine whether a transaction meets a desired confidence threshold of likely validity before it determines that a portable consumer device is authenticated. If the confidence threshold is not met, additional authentication processes can be performed. Such additional authentication processes may include the sending of one or more challenge questions and/or notification messages to the consumer.

Illustratively, a back end server computer may receive an authorization request message from a POS terminal after a consumer tries to pay for office supplies using a payment card. The back end server computer may determine that one of the three card verification technologies in Table I above is present, and that there have not been any recent suspicious transactions associated the payment card. The back end server computer may thereafter determine that the transaction is valid (i.e., a confidence threshold has been met) and can proceed if the transaction is otherwise authorized by the issuer of the payment card. Conversely, if a card and reader are used to conduct the transaction and none of the three card protection technologies in Table 1 (above) is used, and the profile of the transaction deemed to be risky, then the server computer may determine that a confidence threshold has not been met, and additional authentication processes can be initiated by the server computer. For example, a dynamic challenge (query) can be sent to the consumer before approval, and/or the consumer can be notified that a transaction is occurring.

Transaction confidence determinations can also take into account whether one algorithm could be more reliable than the other. The back end server computer can evaluate the algorithm that was used at the front end (e.g., at the POS terminal) and can determine whether or not the transaction should proceed. For example, the back end server computer may determine that the algorithm from company A may have 90% reliability and the algorithm from Company B may have 50% reliability.

There are a number of reasons why different algorithms may have different levels of reliability. For example, depending on the sensitivity of the terminal, depending on the way that the card is swiped, and depending on the aging of the card, some algorithms may be able to handle data more precisely. In this example, if the server computer receives an authorization request message indicating that the algorithm from Company B is present and there has been recent suspicious activity associated with the payment card, then additional authentication processing may be initiated. On the other hand, if the server computer receives an authorization request message indicating that the algorithm from Company A is present and there has been recent suspicious activity, then the back end server computer may not initiate additional authentication processing.

Illustratively, Retailer 1 may have a relationship with Technology Provider A and Retailer 2 may have a relationship with Technology Provider B. They have may use different algorithms at their point of sale devices. Each one delivers two sets of data using two different algorithms. When they come back to a payment processing organization such as Visa, it may identify data as originating from a Technology Provider A algorithm, and/or from Technology Provider B algorithm. Weight can be put on the algorithms so that a confidence level can be determined. Additional authentication processing may then take place if a confidence level (or threshold) is not satisfied.

III. Exemplary Systems

Figure 1:
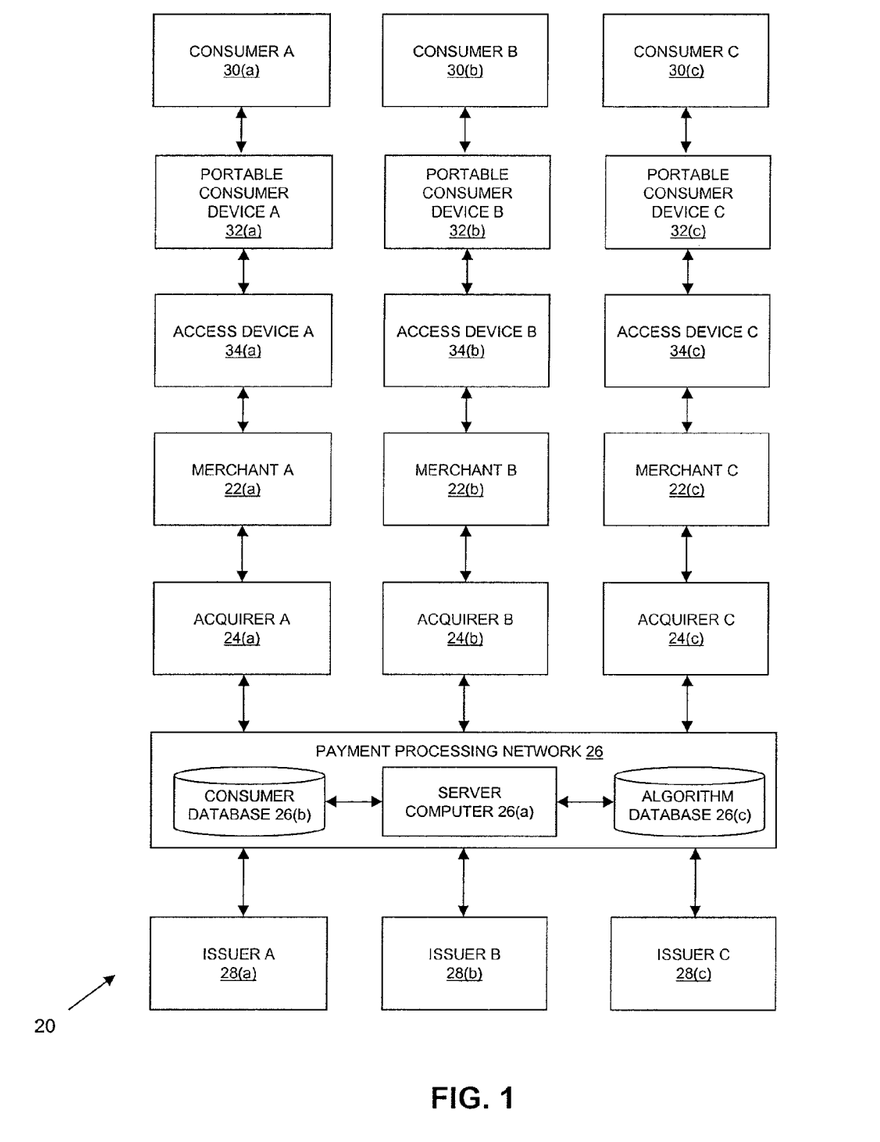
FIG. 1 shows a block diagram of a system according to an embodiment of the invention.

FIG. 1 shows a system 20 that can be used in an embodiment of the invention. The system 20 includes a plurality of merchants 22(a), 22(b), 22(c) and a plurality of acquirers 24(a), 24(b), 24(c) associated with the merchants 22(a), 22(b), 22(c). In typical payment transactions, consumers 30(a), 30(b), 30(c) may purchase goods or services at the merchants 22(a), 22(b), 22(c) using their portable consumer devices 32(a), 32(b), 32(c). The consumers 30(a), 30(b), 30(c) may be individuals, or organizations such as businesses. The acquirers 24(a), 24(b), 24(c) can communicate with the issuers 28(a), 28(b), 28(c) via a payment processing network 26. The issuers 28(a), 28(b), 28(c) may respectively issue portable consumer devices 30(a), 30(b), 30(c) to the consumers 30(a), 30(b), 30(c).

For purposes of illustration, access device A 32(a) may be produced by Company A, which may be associated with an algorithm with an algorithm identifier "01". Access device B 32(b) may be produced by Company B and may be associated with an algorithm with an algorithm identifier "02". Access device C 32(c) may be associated with Company D and may have no algorithm associated with it.

The portable consumer devices 32(a), 32(b), 32(c) may be in any suitable form. For example, suitable portable consumer devices 32(a), 32(b), 32(c) can be hand-held and compact so that they can fit into a consumer's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, and the like. The portable consumer devices can also be debit devices (e.g., a debit card), credit devices (e.g., a credit card), or stored value devices (e.g., a stored value card).

Figure 2:
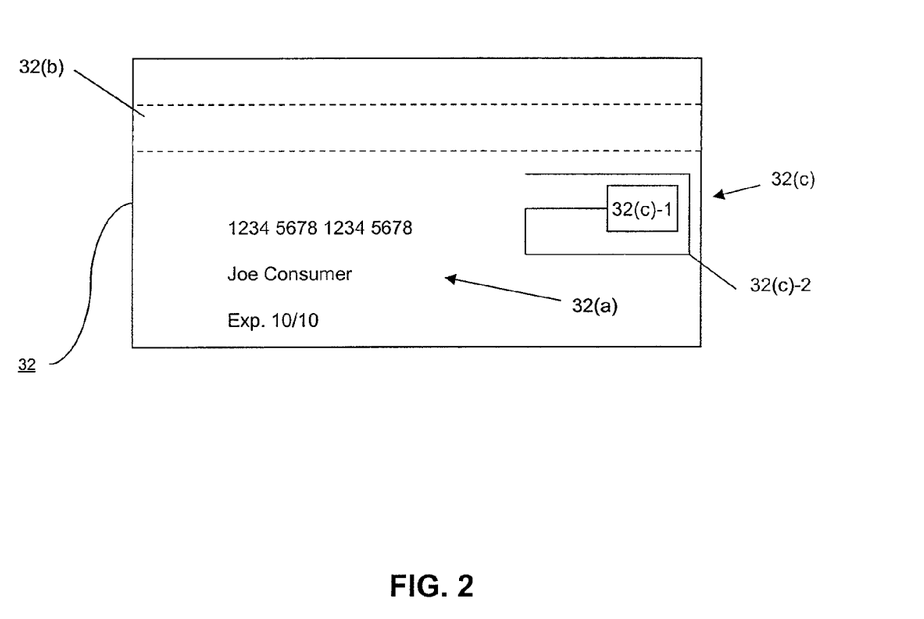
FIG. 2 shows a schematic illustration of a portable consumer device in the form of a card.

FIG. 2 shows a schematic illustration of a portable consumer device 32 in the form of a card. The portable consumer device 32 includes a contactless element 32(c) comprising a memory device 32(c)-1 such as a chip, and an antenna 32(c)-2 operatively coupled to the memory device 32(c)-1. FIG. 2 also shows consumer data 32(a) comprising an account number (e.g., 1234 5678 1234 5678), an account name (e.g., Joe Consumer), and an expiration date (e.g., 10/10) associated with the portable consumer device 32. The portable consumer device 32 may also comprise a magnetic stripe 32(b).

Information in the memory device 32(c)-1 or stripe 32(b) may also be in the form of data tracks that are traditionally associated with credits cards. Such tracks include Track 1, Track 2 and other chip or account data. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account number, encrypted PIN data, plus other discretionary or supplemental data.

The merchants 22(a), 22(b), 22(c) may also have, or may receive communications from, respective access devices 34(a), 34(b), 34(c) that can interact with the portable consumer devices 32(a), 32(b), 32(c). The access devices according to embodiments of the invention can be in any suitable form. Examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like.

If the access device is a point of sale terminal, any suitable point of sale terminal may be used including card readers. The card readers may include any suitable contact or contactless mode of operation. For example, exemplary card readers can include RF (radio frequency) antennas, magnetic stripe readers, etc. to interact with the portable consumer devices 32(a), 32(b), 32(c).

Figure 3:
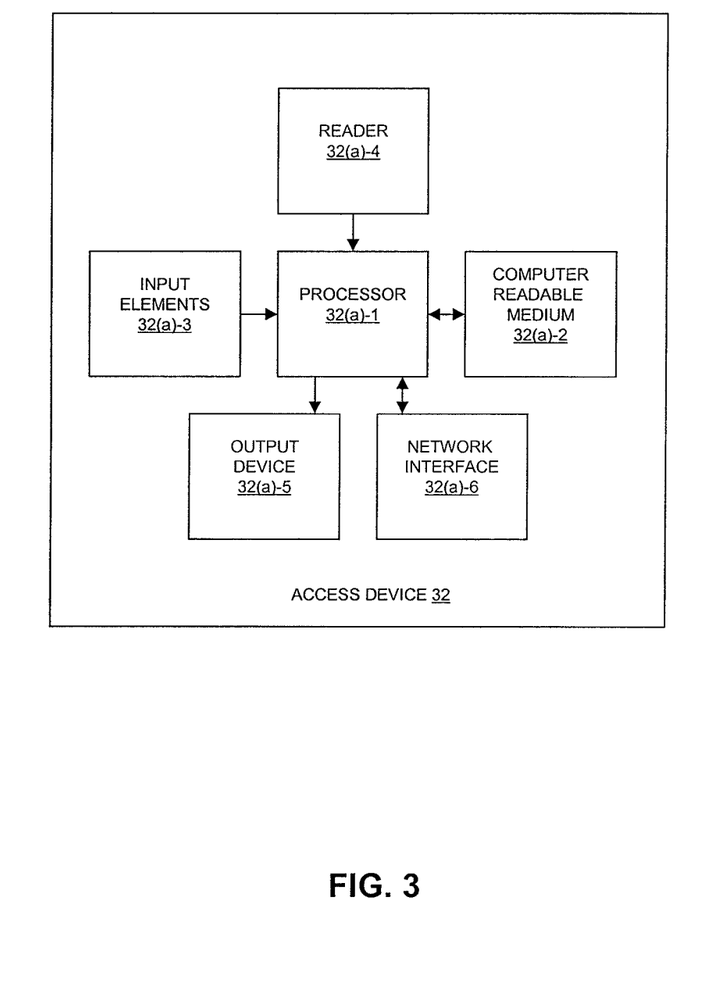
FIG. 3 shows a block diagram of an access device.

FIG. 3 shows a block diagram of an access device 32 according to an embodiment of the invention. The access device 32 comprises a processor 32(a)-1 operatively coupled to a computer readable medium 32(a)-2 (e.g., one or more memory chips, etc.), input elements 32(a)-3 such as buttons or the like, a reader 32(a)-4 (e.g., a contactless reader, a magnetic stripe reader, etc.), an output device 32(a)-5 (e.g., a display, a speaker, etc.) and a network interface 32(a)-6.

The payment processing network 26 may include data processing subsystems, networks, and operations used to support and deliver authorization services, routing and switching, exception file services, and clearing and settlement services. An exemplary payment processing system may include VisaNet™. Payment processing systems such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 26 may include a server computer 26(a). A server computer is typically a powerful computer or cluster of computers. For example, the server computer can be a large mainframe, a minicomputer cluster, or a group of servers functioning as a unit. In one example, the server computer may be a database server coupled to a Web server. The payment processing system 26 may use any suitable wired or wireless network, including the Internet. It may include a processor a computer readable medium comprising instructions (described herein) executable by the processor.

Figure 4:
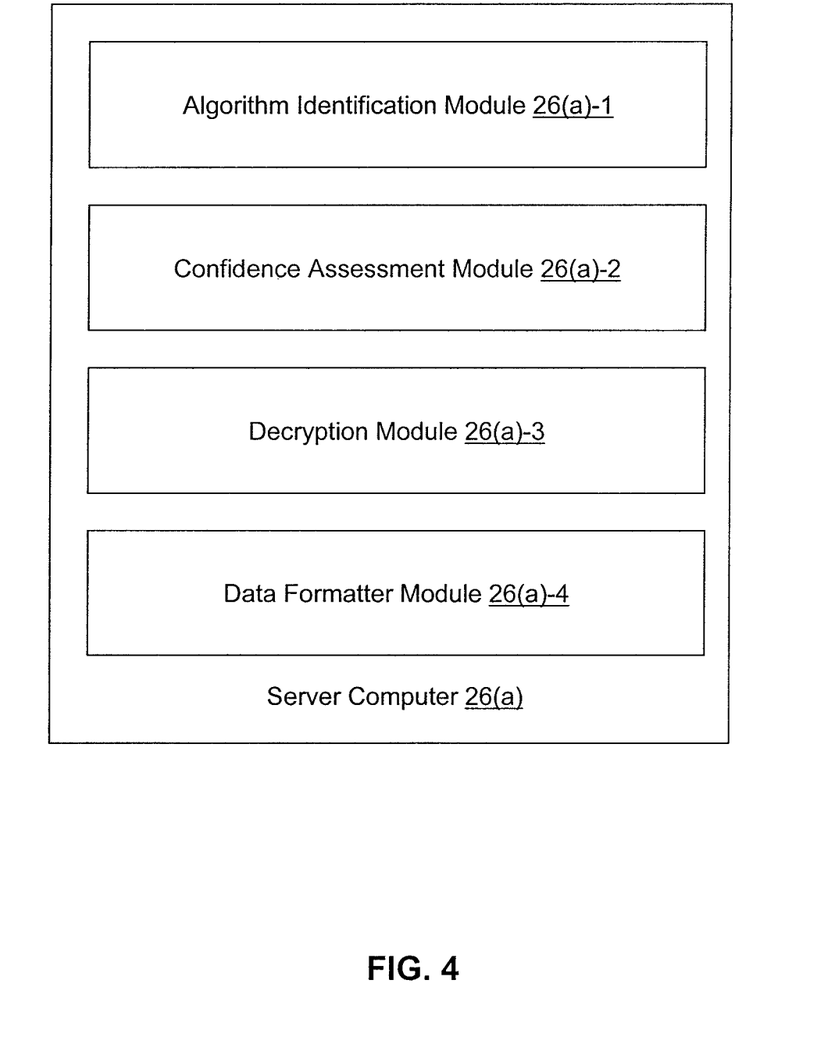
FIG. 4 shows a block diagram of some software modules that may reside on a server computer.

The server computer 26(a) may comprise any suitable number of software modules and they may be of any suitable type. As shown in FIG. 4, the server computer 26(a) may comprise an algorithm identification module 26(a)-1 and a confidence assessment module 26(a)-2. It may also comprise a decryption module 26(a)-3, as well as a data formatter module 26(a)-4.

The algorithm identification module 26(a)-1, in conjunction with the decryption module 26(a)-3, may review a received authorization request message including an algorithm ID and an altered portable consumer device fingerprint. From the received algorithm ID, it may then determine which algorithm was used to alter (e.g., encrypt) the portable consumer device fingerprint. A lookup table or the like may be used to identify correspondence between the algorithm ID, the algorithm(s) used to alter a portable consumer device fingerprint or restore an altered portable consumer device fingerprint, and consumer data (e.g., an account number). (In some cases, the algorithm may be a key in an encryption process.) The server computer 26(a) may then be used to determine (e.g., by unencrypting) the portable consumer device fingerprint from the altered portable consumer device fingerprint in an authorization request message. Once the portable consumer device fingerprint is determined, this information may be analyzed to determine if it corresponds to a stored fingerprint linked to consumer data (e.g., account number) associated with the portable consumer device.

The confidence assessment module 26(a)-2 may generate a confidence assessment from various pieces of information. Such information may include the type of portable consumer device used (e.g., a phone may be more secure than a payment card), the type of algorithm used to encrypt the portable consumer device fingerprint (e.g., some encryption algorithms are more secure than others), etc. Using the confidence module 26(a)-2, the server computer 26(a) may subsequently determine if additional authentication processes need to take place. Such additional authentication processes may comprise challenge questions and/or consumer notification that a transaction is occurring.

The confidence assessment module 26(a)-2 can "score" a transaction based on a number of transaction variables. If this score exceeds a predetermined threshold, then the transaction can be considered valid and additional authentication processing need not take place. Conversely, if the score does not exceed a predetermined threshold, then the transaction may be characterized as suspicious and additional authentication processes may be initiated.

The data formatter module 26(a)-4 may be used to format data so that it can be used by the confidence assessment module 26(a)-2. In some cases, data that is from different POS terminals from different companies may be decrypted by the decryption module 26(a)-3 and may be in different formats. The data formatter can format any data so that it can be used by the confidence assessment module 26(a)-2.

Figure 5:
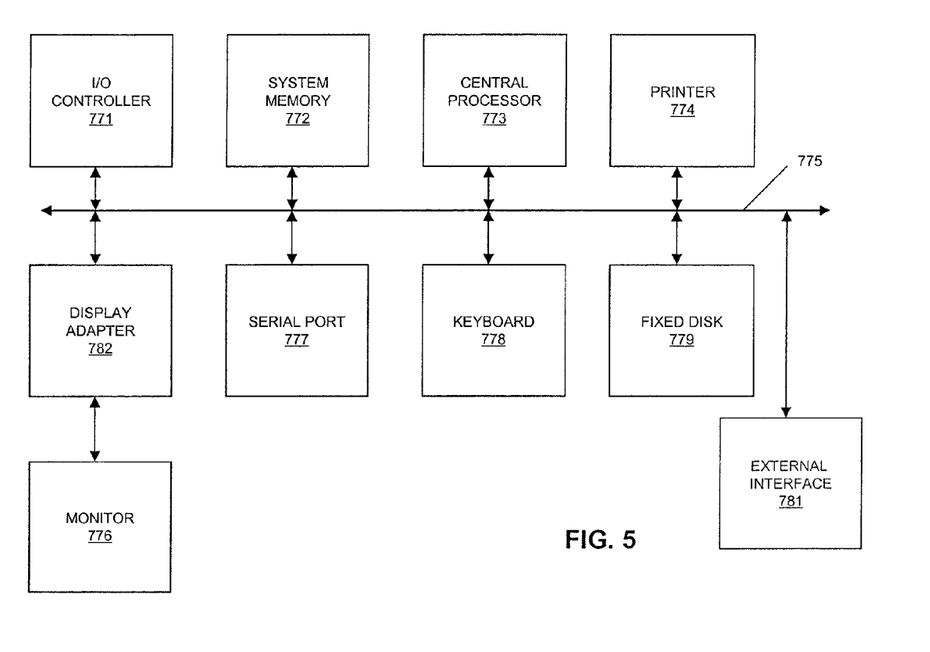
FIG. 5 shows a block diagram of exemplary components in a computer apparatus.

FIG. 5 shows typical components or subsystems of a computer apparatus. Such components (or subsystems) or any subset of such components may be present in various components shown in FIG. 1, including the access devices, server computer, etc. The subsystems shown in FIG. 5 are interconnected via a system bus 775. Additional subsystems such as a printer 774, keyboard 778, fixed disk 779, monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus 775 allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

Embodiments of the invention are not limited to the above-described embodiments. For example, although separate functional blocks are shown for an issuer, payment processing system, and acquirer, some entities perform all of these functions and may be included in embodiments of invention.

IV. Exemplary Methods

Figure 6:
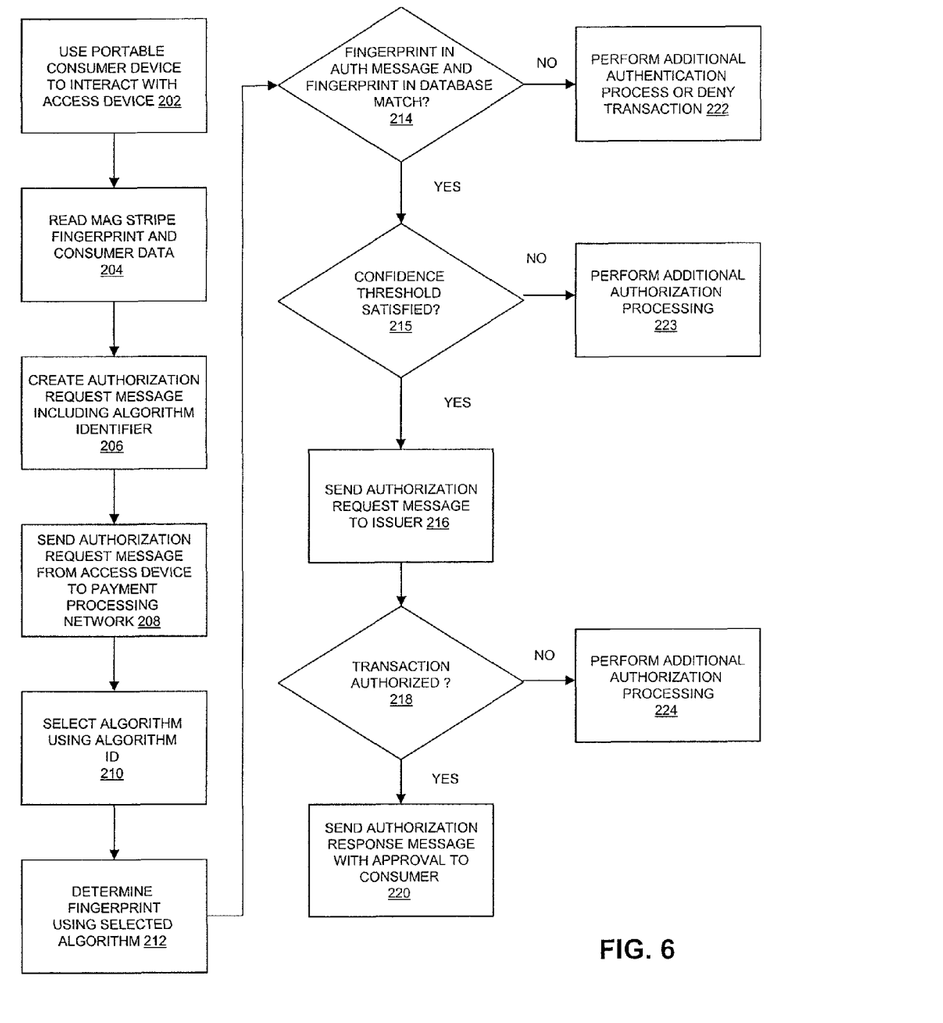
FIG. 6 shows a flowchart illustrating steps in a method according to an embodiment of the invention.
Figure 7:
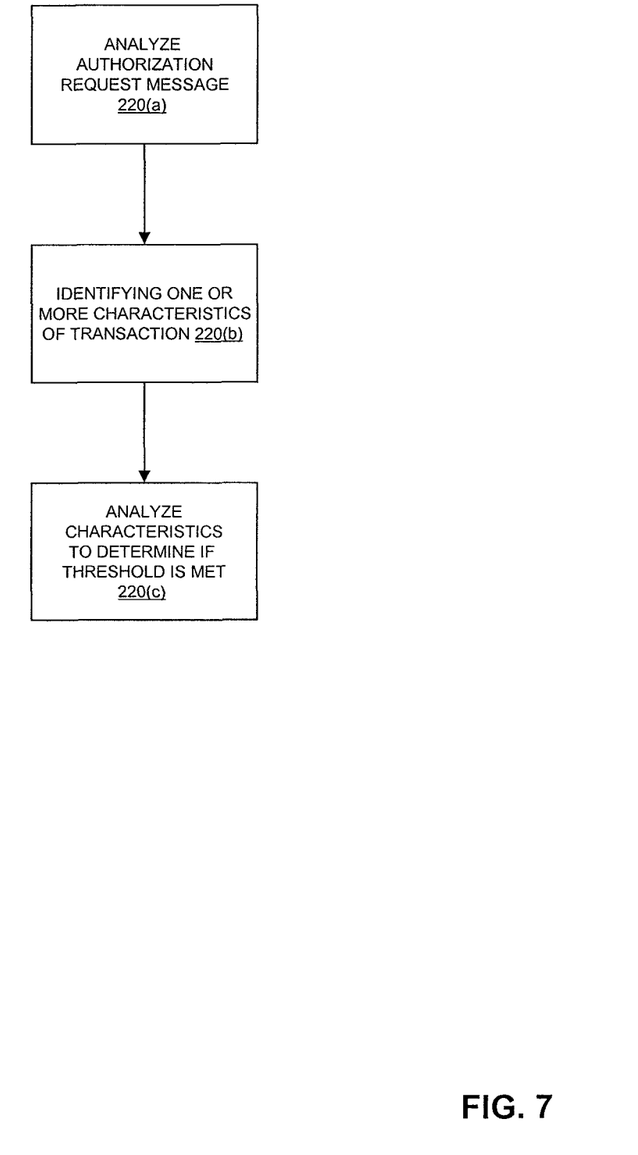
FIG. 7 shows a flowchart of a confidence assessment method according to an embodiment of the invention.

Various methods according to embodiments of the invention may be described with reference to FIGS. 1, 6 and 7. FIGS. 6-7 include flowcharts.

Some or all of the steps shown in FIG. 6 may be included in embodiments of the invention. For example, some embodiments of the invention may use algorithm identifiers to determine if a portable consumer device fingerprint in an authorization request message matches a portable consumer device fingerprint stored in a back end database, and may not perform transaction confidence processing before determining if the transaction is authorized. In other embodiments, a transaction confidence process may be performed without using portable consumer device fingerprints to authenticate portable consumer devices. In preferred embodiments, however, algorithm identifiers, portable consumer device fingerprints, and transaction confidence processing are used to authenticate the portable consumer devices and transactions as a whole.

Also, while the flowcharts shown in FIGS. 6 and 7 shows specific steps being performed in a specific order, embodiments of the invention can include methods which include such steps in a different order.

Referring to FIGS. 1 and 6, a consumer A 30(a) may use a portable consumer device A 32(a) to interact with an access device A 34(a) at a merchant A 22(a) (step 202). For example, the portable consumer device 32(a) may be a credit card, the access device A 34(a) may be a point of sale terminal, and the merchant A 22(a) may be a gas station. Consumer A 30(a) may want to purchase gas from merchant A 22(a) using the portable consumer device A 32(a).

After the portable consumer device A 32(a) interfaces with the access device A 34(a) at merchant A 22(a), the access device A 34(a) reads consumer data and portable consumer device fingerprint data such as magnetic stripe fingerprint data from the portable consumer device A 32(a) (step 204). The consumer data may include information of which the consumer is typically aware. Examples of consumer data include a consumer's account number, expiration date, and service code. As noted above, portable consumer device fingerprint data are data that are not typically known to the consumer, but are used to authenticate the portable consumer device. In this example, the portable consumer device fingerprint data may be magnetic stripe fingerprint data. The magnetic stripe fingerprint data may also comprise data that are embedded into the magnetic structure of the magnetic stripe and are only readable using an access device that is manufactured by a particular company.

Once the access device A 34(a) obtains the consumer data from the portable consumer device A 34(a), an authorization request message including an algorithm identifier is created (step 206). The authorization request message may also include consumer data (e.g., an account number), data relating to the amount of the purchase, and portable consumer device fingerprint data. The access device A 34(a) may alter (e.g., encrypt) the received fingerprint data using an algorithm A that is stored in a memory in access device A 34(a), before it is incorporated into the authorization request message. In some embodiments, the portable consumer device fingerprint and the algorithm identifier may be stored in a supplementary data field called Field 55.

Different types and sizes of fingerprints may originate from different portable consumer devices offered by different manufacturers. These different fingerprints may be inserted into a data field of standard size so that transmission through the payment processing system is uniform regardless of the particular fingerprint being transmitted. For example, in some cases, it is desirable to pad the data field with characters such as zeros to fill up the data field. For example, a data field may have a size of 64 bytes. The fingerprint from one type of portable consumer device may be 54 bytes while the fingerprint from another type of portable consumer device may be 56 bytes. Additional padding characters may be present in the 64 byte field along with a two character algorithm identifier. The padding characters may be placed in the field in a predetermined manner. Equally a TLV (Tag Length Value) format can be used to deliver the payment and authentication data. This approach provides additional flexibility and usage of standard or new payment and authorization message fields.

In embodiments of the invention, the previously described algorithm identifier may not only identify the algorithm used to encrypt a portable consumer device fingerprint; the identified algorithm can also be used to restore the fingerprint to its original form so that it can be evaluated. For example, the algorithm identifier may be used to identify the algorithm that may be used to remove any padding characters to restore the received, but altered fingerprint to its original form so that it can be evaluated.

The authorization request message is then sent from access device 34(a) to the payment processing network 26 directly or via the acquirer A 24(a) associated with the merchant A 22(a) (step 208). In other embodiments, the access device 34(a) could send the authorization request message to the payment processing network directly, instead of through the acquirer A 24(a).

After the authorization request message is received by the payment processing network 26, the server computer 26(a) in the payment processing network 26 analyzes the authorization request message and then selects an algorithm using an algorithm ID that is in the authorization request message (step 210). The selected algorithm ID and the selected algorithm may be selected from the algorithm database 26(c). The algorithm database 26(c) may contain a plurality of algorithm IDs and a plurality of algorithms which may be associated with various access devices (e.g., access device A 32(a) and access device B 34(b)).

After the algorithm is identified, the portable consumer device fingerprint is determined by the server computer 26(a) in the payment processing network 26 (step 212). The selected algorithm is then used to restore (e.g., decrypt) the altered portable consumer device fingerprint present in the authorization request message.

Then, the server computer 26(a) determines if the determined portable consumer device fingerprint corresponds to a previously stored fingerprint in a database (step 214). The server computer 26(a) can first obtain consumer data such as the consumer's account number from the authorization request message and/or may obtain additional consumer data from the consumer database 26(b) after analyzing the authorization request message. Once the consumer data are determined, the server computer 26(a) can obtain the portable consumer device fingerprint from the consumer database 26(b). The server computer 26(a) then determines if the portable consumer device fingerprint in the authorization request message and the portable consumer device fingerprint in the consumer database 26(b) match.

If the portable consumer device fingerprint obtained from the consumer database 26(b) does not correspond to the previously restored portable consumer device fingerprint obtained from the authorization request message, then additional authentication processes may be performed and/or an authorization response message may be sent back to the consumer A 22(a) indicating that the transaction is denied (step 222). Additional authentication processing may include sending a transaction notification message to the consumer A 22(a) (e.g., to the consumer's cell phone or the consumer's computer) notifying the consumer that a transaction is taking place. The notification message may request that the consumer A 22(a) confirm that the transaction is authentic. Alternatively or additionally, other types of challenges, such as challenge questions, may be sent to consumer A 22(a). Challenges such as challenge questions are described in further detail in U.S. patent application Ser. No. 11/763,240, filed on Jun. 14, 2007, which is herein incorporated by reference in its entirety for all purposes.

In some embodiments, if a fingerprint obtained from the authorization request message and the fingerprint in the consumer database 26(b) match, the server computer 26(a) may also optionally determine if a transaction confidence threshold is satisfied (step 215). If the confidence threshold is not satisfied, then additional authorization processing may be performed (step 223). If, however, the confidence threshold is satisfied, the authorization may be processed on behalf of the issuer or an authorization request message may then be forwarded onto issuer A 28(a) (step 216) for final decisioning.

The transaction confidence threshold may take any number of transaction characteristics to score the transaction as being authentic or potentially suspicious. Such transaction characteristics may relate to the access device (e.g., whether the access device uses new or old technology, whether the access device uses a secure encryption algorithm to encrypt data, etc.), portable consumer device (e.g., whether the portable consumer device is a phone, a magnetic stripe card with old technology, a magnetic stripe card with new technology, etc.), etc.

As noted above, in a payment processing system, there can be many different combinations of access devices and portable consumer devices interacting together at any given time. These different combinations of access devices and potable consumer devices may initiate transactions that may have different levels of potential authenticity. For example, referring to FIG. 1, access device A 34(a) may use an encryption algorithm from company A to encrypt data in an authorization request message, access device B 34(b) may use an encryption algorithm from company B, and access device C 34(c) may not use any encryption technology. Encryption algorithm A may be considered a more reliable encryption algorithm than encryption algorithm B. Consequently, authorization request messages from access device A 34(a) may have a higher level of potential authenticity than authorization request messages from access device B 34(b) or access device C 34(c). Additional authentication processing may be performed when transactions are performed access devices B and C 34(b), 34(c) rather than the access device A 34(a). In another example, if portable consumer devices A, B, and C 32(a), 32(b), 32(c) are all highly secure portable consumer devices, then only authorization request messages coming from access device C 34(c) may be require additional authentication processing, since only the access device C 34(c) does not contain an encryption algorithm. As illustrated by this example, the threshold for determining whether or not additional authorization processing needs to be performed can be varied and can be set according to predetermined rules.

After the authorization request message is received by issuer A 28(a), issuer A may then determine if the transaction is authorized. If the transaction is not authorized (e.g., due to insufficient funds or credit in consumer A's account), then additional authorization processing may be performed and/or an authorization response message indicating that the transaction is declined may be sent to consumer A 30(a) (step 224).

If the transaction is approved by issuer A 28(a), then an authorization response message may be sent back to consumer A 30(a) via the payment processing network 26, acquirer A 24(a), merchant A 22(a), and access device A 34(a) (step 220).

At the end of the day, a normal clearing and settlement process can be conducted by the transaction processing system 26. A clearing process is a process of exchanging financial details between an acquirer and an issuer to facilitate posting to a consumer's account and reconciliation of the consumer's settlement position. Clearing and settlement can occur simultaneously.

IV. Authentication Systems

The above-described portable authentication processes can be part of a larger overall transaction authentication process.

Figure 8:
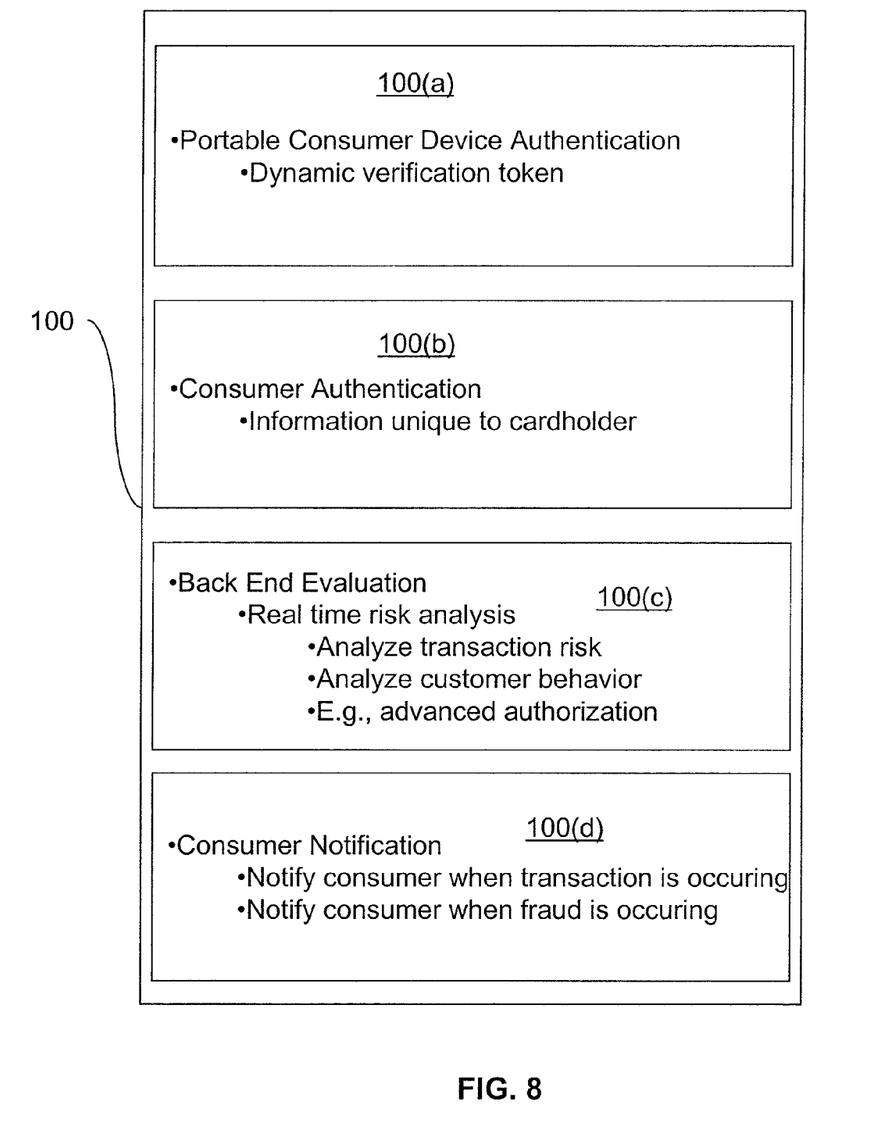
FIG. 8 shows a block diagram of components in an authentication system.

FIG. 8 shows a conceptual block diagram 100, the authentication of a purchase transaction can have various aspects. Such aspects include portable consumer device authentication 100(a), consumer authentication 100(b), back end processing including real time risk analysis 100(c), and consumer notification of the purchase transaction 100(d).

Portable consumer device authentication relates to the authentication of the portable consumer device. That is, in a portable consumer device authentication process, a determination is made as to whether the portable consumer device that is being used in the purchase transaction is the authentic portable consumer device or a counterfeit portable consumer device. Specific exemplary techniques for improving the authentication of a portable consumer device include:
- Dynamic CVV on portable consumer devices such as magnetic stripe cards
- Card security features (existing and new)
- Contactless chips (limited use)
- Magnetic stripe identification
- Card Verification Values (CVV and CVV2)
- Contact EMV chips Consumer authentication relates to a determination as to whether or not the person conducting the transaction is in fact the owner or authorized user of the portable consumer device. Conventional consumer authentication processes are conducted by the merchants. For example, merchants may ask to see a credit card holder's driver's license, before conducting a business transaction with the credit card holder. Other ways to authenticate the consumer would be desirable, since consumer authentication at the merchant does not occur in every instance. Specific examples of possible ways to improve the consumer authentication process include at least the following:
- Knowledge-based challenge-responses
- Hardware tokens (multiple solution options)
- OTPs (one time password, limited use)
- AVSs (not as a stand alone solution)
- Signatures
- Software tokens
- PINs (online/offline)
- User IDs/Passcodes
- Two-channel authentication processes (e.g., via phone)
- Biometrics Back end processing relates to processing that may occur at the issuer or payment processing system, or other non-merchant location. Various processes may be performed at the "back end" of the payment transaction to help ensure that any transactions being conducted are authentic. Back end processing may also prevent transactions that should not be authorized, and can allow transactions that should be authorized.

Lastly, consumer notification is another aspect of transaction authentication. In some cases, a consumer may be notified that a purchase transaction is occurring or has occurred. If the consumer is notified (e.g., via cell phone) that a transaction is occurring using his portable consumer device, and the consumer is in fact not conducting the transaction, then appropriate steps may be taken to prevent the transaction from occurring. Specific examples of consumer notification processes include:
- Purchase notification via SMS
- Purchase notification via e-mail
- Purchase notification by phone Other details regarding some of the above-described aspects are provided in U.S. Provisional Patent Application No. 60/815,059, filed on Jun. 19, 2006, U.S. Provisional Patent Application No. 60/815,430 filed on Jun. 20, 2006, and U.S. Provisional Patent Application No. 60/884,089 filed on Jan. 9, 2007, which are herein incorporated by reference in their entirety for all purposes. The specific details of the specific aspects may be combined in any suitable manner without departing from the spirit and scope of embodiments of the invention. For example, portable consumer device authentication, consumer authentication, back end processing, and consumer transaction notification may all be combined in some embodiments of the invention. However, other embodiments of the invention may be directed to specific embodiments relating to each individual aspects, or specific combinations these individual aspects.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents. For example, although algorithms for use in encrypting portable consumer device fingerprints are described in detail, the algorithms may be used for any other suitable end use in embodiments of the invention.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A computer-implemented method comprising:
receiving an authorization request message associated with a payment transaction, by a server computer, wherein the authorization request message is generated after an interaction between a portable consumer device and an access device, wherein as a result of the interaction, the access device reads an account number and an expiration date associated with the portable consumer device;
after receiving the authorization request message, selecting an algorithm from among a plurality of algorithms associated with different types of portable consumer device fingerprinting systems using an algorithm identifier stored on a non-transitory computer readable medium of the server computer, wherein different types of portable consumer device fingerprinting systems are associated with different companies that each use their own proprietary algorithm in the access device to alter a fingerprint of a portable consumer device;
analyzing the authorization request message, using the server computer, for one or more characteristics of the portable consumer device or the access device to determine when a confidence threshold associated with the payment transaction is met or exceeded; and
when the confidence threshold is not exceeded, performing additional authentication processing, by the server computer, to authenticate the portable consumer device for the payment transaction.

2. The method of claim 1 wherein the one or more characteristics of the portable consumer device include a particular portable consumer device used.

3. The method of claim 1 wherein the one or more characteristics of the access device include a particular algorithm used to alter a portable consumer device fingerprint associated with the portable consumer device.

4. The method of claim 3 wherein analyzing the authorization request message comprises analyzing at least one characteristic of the access device and at least one characteristic of the portable consumer device to determine when the confidence threshold is met or exceeded.

5. The method of claim 4 wherein the one or more characteristics of the access device include a particular algorithm present in the access device.

6. The method of claim 4 wherein the portable consumer device is a payment card.

7. The method of claim 4 wherein the portable consumer device is a phone.

8. The method of claim 4, wherein the method further comprises:
sending an authorization response message to a consumer without performing additional authentication processing when the confidence threshold is met.

9. The method of claim 1 wherein the additional authentication processing comprises sending a consumer a message to a phone operated by the consumer or to an access device used to conduct the payment transaction, wherein the message indicates that the payment transaction is occurring.

10. The method of claim 1, further comprises determining whether the profile of the payment transaction is deemed to be risky.

11. The method of claim 1, wherein analyzing the authorization request message for the one or more characteristics of the portable consumer device further comprises determining whether there has been any recent suspicious payment transaction associated with the portable consumer device.

12. The method of independent claim 1, wherein the authorization request message contains a particular algorithm identification associated with a Point of Sale terminal.

13. The method of independent claim 1, wherein the authorization request message contains a particular algorithm identification associated with an altered portable consumer device fingerprint.

14. The method of claim 1, wherein analyzing the authorization request message, using the server computer, encompasses one or more characteristics of the portable consumer device or the access device to determine when the confidence threshold associated with the payment transaction is met or exceeded is performed by a confidence assessment module stored on the computer.

15. The method of claim 14, wherein the confidence assessment module generates a confidence assessment from type of the portable consumer device and type of algorithm used to encrypt the portable consumer device fingerprint.

16. A system comprising:
means for receiving an authorization request message associated with a payment transaction, wherein the authorization request message is generated after an interaction between a portable consumer device and an access device, wherein as a result of the interaction, the access device reads an account number and an expiration date associated with the portable consumer device;

means for selecting an algorithm, after receiving the authorization request message, from among a plurality of algorithms associated with different types of portable consumer device fingerprinting systems using an algorithm identifier, wherein different types of portable consumer device fingerprinting systems are associated with different companies that each use their own proprietary algorithm in the access device to alter a portable consumer device fingerprint;

means for analyzing the authorization request message for one or more characteristics of the portable consumer device or the access device to determine when a confidence threshold associated with the payment transaction is met or exceeded; and means for performing additional authentication processing when the confidence threshold is not exceeded to authenticate the portable consumer device for the payment transaction.

17. The system of claim 16 wherein the one or more characteristics of the portable consumer device include a particular portable consumer device.

18. The system of claim 16 wherein the one or more characteristics of the access device include a particular algorithm in the access device.

19. The system of claim 16 wherein the means for analyzing the authorization request message comprises means for analyzing at least one characteristic of the access device and at least one characteristic of the portable consumer device.

20. The system of claim 16 wherein the portable consumer device is a payment card.

21. A system comprising:

a server computer comprising a processor; and a non-transitory computer readable medium coupled to the non-transitory computer readable medium, the non-transitory computer readable medium having computer readable program codes embodies therein for:

receiving an authorization request message associated with a payment transaction, wherein the authorization request message is generated after an interaction between a portable consumer device and an access device;

wherein as a result of the interaction, the access device reads an account number and an expiration date associated with the portable consumer device;

after receiving the authorization request message, selecting an algorithm from among a plurality of algorithms associated with different types of portable consumer device fingerprinting systems using an algorithm identifier, wherein different types of portable consumer device fingerprinting systems are associated with different companies that each use their own proprietary algorithm in the access device to alter a fingerprint of a portable consumer device;

analyzing the authentication request message for one or more characteristics of the portable consumer device or the access device to determine when a confidence threshold associated with the payment transaction is met or exceeded, and performing additional authentication processing when the confidence threshold is not exceeded to authenticate the portable consumer device for the payment transaction.

22. The system of claim 21 further comprising the access device in operative communication with the server computer.

23. The system of claim 22 wherein the access device is a POS terminal.

24. The system of claim 21 wherein the one or more characteristics of the access device includes a particular algorithm that is used by the access device to encrypt data from the portable consumer device.

25. The system of claim 21 wherein the one or more characteristics of the portable consumer device includes a particular portable consumer device.

26. The system of claim 21, wherein the system further comprises an algorithm database including a plurality of algorithm identifications and a plurality of algorithms associated with one or more access devices.

* * * * *